United States Patent
Murase

(10) Patent No.: US 11,472,947 B2
(45) Date of Patent: Oct. 18, 2022

(54) PNEUMATIC TIRE

(71) Applicant: The Yokohama Rubber Co., LTD., Tokyo (JP)

(72) Inventor: Keisuke Murase, Hiratsuka (JP)

(73) Assignee: The Yokohama Rubber Co., LTD., Tokyo (JP)

(*) Notice: Subject to any disclaimer, the term of this patent is extended or adjusted under 35 U.S.C. 154(b) by 266 days.

(21) Appl. No.: 16/636,006

(22) PCT Filed: Jun. 26, 2018

(86) PCT No.: PCT/JP2018/024220
§ 371 (c)(1),
(2) Date: Feb. 1, 2020

(87) PCT Pub. No.: WO2019/026477
PCT Pub. Date: Feb. 7, 2019

(65) Prior Publication Data
US 2021/0139675 A1 May 13, 2021

(30) Foreign Application Priority Data
Aug. 1, 2017 (JP) .............. JP2017-149358

(51) Int. Cl.
| C08L 7/00 | (2006.01) |
| B60C 1/00 | (2006.01) |
| B60C 11/00 | (2006.01) |
| B60C 11/03 | (2006.01) |
| C08L 9/06 | (2006.01) |
| B60C 5/00 | (2006.01) |
| C08K 5/5419 | (2006.01) |
| C08K 3/36 | (2006.01) |
| C08K 5/372 | (2006.01) |

(52) U.S. Cl.
CPC ............... C08L 7/00 (2013.01); B60C 1/00 (2013.01); B60C 1/0016 (2013.01); B60C 5/00 (2013.01); B60C 11/0008 (2013.01); B60C 11/03 (2013.01); B60C 11/0304 (2013.01); C08K 3/36 (2013.01); C08K 5/372 (2013.01); C08K 5/5419 (2013.01); C08L 9/06 (2013.01); B60C 2011/0341 (2013.01); B60C 2011/0348 (2013.01); B60C 2011/0358 (2013.01); C08L 2205/035 (2013.01)

(58) Field of Classification Search
CPC ........ C08L 9/06; C08L 7/00; C08L 2205/035; B60C 5/00; B60C 11/0008; B60C 1/0016; B60C 11/0304; B60C 1/00; B60C 11/03; B60C 2011/0341; B60C 2011/0348; B60C 2011/0358; C08K 2201/006; C08K 3/36; C08K 5/372; C08K 5/5419; Y02T 10/86
See application file for complete search history.

(56) References Cited

U.S. PATENT DOCUMENTS

| 2011/0301280 A1 | 12/2011 | Kushida |
| 2013/0237653 A1 | 9/2013 | Takizawa et al. |
| 2015/0075686 A1 | 3/2015 | Suga |
| 2016/0159159 A1 | 6/2016 | Horiuchi |
| 2017/0305198 A1 * | 10/2017 | Ichimura ............ B60C 11/1236 |
| 2017/0362415 A1 * | 12/2017 | Iizuka ............... C08L 91/00 |

FOREIGN PATENT DOCUMENTS

| JP | 2002-293783 | 10/2002 | |
| JP | 2007-092086 | 4/2007 | |
| JP | 2010-077257 | 4/2010 | |
| JP | 2011-252124 | 12/2011 | |
| JP | 2013-213183 | 10/2013 | |
| JP | 2013-224132 | 10/2013 | |
| JP | 2014-210870 | 11/2014 | |
| JP | 2016-065260 | 4/2016 | |
| WO | WO 2013/141261 | 9/2013 | |
| WO | WO 2015/012160 | 1/2015 | |
| WO | WO-2016056505 A1 * | 4/2016 | ......... B60C 11/1392 |
| WO | WO-2016088811 A  * | 6/2016 | ............... C08K 3/36 |

OTHER PUBLICATIONS

International Search Report for International Application No. PCT/JP2018/024220 dated Oct. 2, 2018, 4 pages, Japan.

* cited by examiner

Primary Examiner — Angela C Scott
(74) Attorney, Agent, or Firm — Thorpe North & Western

(57) ABSTRACT

In a pneumatic tire, a tread portion comprises longitudinal and/or lateral grooves; a groove area ratio of a vehicle inner side region of the tread portion ranges from 30% to 39%; a difference between the groove area ratio Sin and a groove area ratio Sout ranges from 6-14%; and the rubber composition comprises a diene rubber comprising from 10-30 parts by mass of natural rubber and from 70-90 parts by mass of a solution polymerized styrene-butadiene rubber and/or an emulsion polymerized styrene-butadiene rubber per 100 parts by mass of the diene rubber, from 80-150 parts by mass of silica per 100 parts by mass of the diene rubber, from 0.5-10 parts by mass of a cyclic polysulfide per 100 parts by mass of the diene rubber, and from 3-10 mass % of an alkyltriethoxysilane having an alkyl group having from 3-20 carbons relative to an amount of the silica.

6 Claims, 2 Drawing Sheets

PNEUMATIC TIRE

TECHNICAL FIELD

The present technology relates to a pneumatic tire with a tread portion comprising a rubber composition for a tread including silica.

BACKGROUND ART

Examples of required performances of a pneumatic tire include excellent dry performance and wet performance, low rolling resistance, and excellent wear resistance at high speeds. In particular, high performance tires require these performances to be obtained in a compatible manner to a high degree. Blending a large amount of silica with a rubber composition for a tread used in tread portions of pneumatic tires is a known technique for providing dry performance and wet performance in a compatible manner to a high degree (see Japan Unexamined Patent Publication No. 2010-077257 for example). However, simply blending silica affects rolling resistance and wear resistance at high speeds, resulting in all of the performances being unable to be obtained in a well-balanced manner to a high degree. Thus, there is a demand for a way to improve rolling resistance and wear resistance at high speeds and also for maintaining excellent dry performance and wet performance obtained by blending a large amount of silica.

SUMMARY

The present technology provides a pneumatic tire with a tread portion comprising a rubber composition for a tread including silica, the pneumatic tire having improved rolling resistance and wear resistance at high speeds while maintaining excellent dry performance and wet performance.

A pneumatic tire according to an embodiment of the present technology comprises:
a designated mounting direction with respect to a vehicle; and
a tread portion with an annular shape extending in a tire circumferential direction, the tread portion comprising
longitudinal grooves extending in the tire circumferential direction and/or lateral grooves extending in a tire lateral direction, and being made of a rubber composition for a tread; wherein
a groove area ratio Sin of a vehicle inner side region corresponding to a vehicle inner side of a tire equator of the tread portion ranges from 30% to 39%;
a difference ΔS between the groove area ratio Sin and a groove area ratio Sout of a vehicle outer side region corresponding to a vehicle outer side of a position the tire equator of the tread portion ranges from 6% to 14%; and
the rubber composition for a tread comprises
a diene rubber comprising from 10 parts by mass to 30 parts by mass of natural rubber and from 70 parts by mass to 90 parts by mass of a solution polymerized styrene-butadiene rubber and/or an emulsion polymerized styrene-butadiene rubber per 100 parts by mass of the diene rubber,
from 80 parts by mass to 150 parts by mass of silica,
from 0.5 parts by mass to 10 parts by mass of a cyclic polysulfide expressed by Formula 1 below, and
from 3 mass % to 10 mass % of an alkyltriethoxysilane having an alkyl group having from 3 to 20 carbons relative to an amount of the silica

(in Formula 1, R is a substituted or unsubstituted alkylene group having from 4 to 8 carbons, or a substituted or unsubstituted oxyalkylene group having from 4 to 8 carbons; x is a number averaging from 3 to 5; and n is an integer from 1 to 5).

The pneumatic tire according to an embodiment of the present technology is made of the rubber composition for a tread with the composition described above. Thus, it can provide excellent dry performance and wet performance, reduced rolling resistance, and enhanced wear resistance at high speeds. Dry performance and wet performance are relatively difficult to enhance via only modifying the physical properties of the rubber composition for a tread. However, by setting the groove area ratio Sin and the difference ΔS in the appropriate ranges described above, these performances can be obtained in a well-balanced manner to a high degree. In addition to the relationship described above, by setting the groove area ratio Sout to from 20% to 30%, dry performance and wet performance can be further effectively enhanced.

In an embodiment of the present technology, preferably the silica has a CTAB (cetrimonium bromide) adsorption specific surface area ranging from 180 m²/g to 250 m²/g. This improves the physical properties of the rubber composition for a tread and is advantageous in obtaining good dry performance, wet performance, rolling resistance, and wear resistance at high speeds in a compatible manner.

In an embodiment of the present technology, preferably from 1 part by mass to 25 parts by mass of an aromatic terpene resin is blended per 100 parts by mass of the diene rubber. This improves the physical properties of the rubber composition for a tread and is advantageous in obtaining good dry performance, wet performance, rolling resistance, and wear resistance at high speeds in a compatible manner.

Note that in the present technology, the groove area ratio Sin of the vehicle inner side region and the groove area ratio Sout of the vehicle outer side region are groove area ratios for within the ground contact region of the tread portion and are ratios (%) of the total area of groove portions in the region to the total area of the region including land portions and groove portions. "Ground contact region" is the region between end portions (ground contact edges) in the tire axial direction of the surface (ground contact surface) that comes into contact with the surface the tire is placed on when the tire is mounted on a regular rim and inflated to a regular internal pressure, and placed vertically upon a flat surface with a regular load applied thereto. "Regular rim" is a rim defined by a standard for each tire according to a system of standards that includes standards on which tires are based, and refers to a "standard rim" in the case of JATMA, refers to a "design rim" in the case of TRA, and refers to a "measuring rim" in the case of ETRTO. "Regular internal pressure" is an air pressure defined by standards for each tire according to a system of standards that includes standards on which tires are based, and refers to a "maximum air pressure" in the case of JATMA (Japan Automobile Tyre Manufacturers Association, Inc.), refers to a maximum value in the table of "TIRE ROAD LIMITS AT VARIOUS COLD INFLATION PRESSURES" in the case of TRA (The Tire and Rim Association, Inc.), and refers to the "INFLATION PRESSURE" in the case of ETRTO (European Tire and Rim Technical Organization). "Regular internal pressure" is 180 kPa for a tire on a passenger vehicle. "Regular load" is a load defined by a standard for each tire according to a system of standards that includes standards on which tires are based, and refers to a "maximum load capacity" in the case of JATMA, refers to a maximum value in the table of "TIRE ROAD LIMITS AT VARIOUS COLD INFLATION PRESSURES" in the case of TRA, and refers to "LOAD CAPACITY" in the case of ETRTO. If the tire is for use with a passenger vehicle, a load corresponding to 88% of the loads described above is used.

DETAILED DESCRIPTION

Configurations of embodiments of the present technology will be described in detail below with reference to the accompanying drawings.

Figure 1:
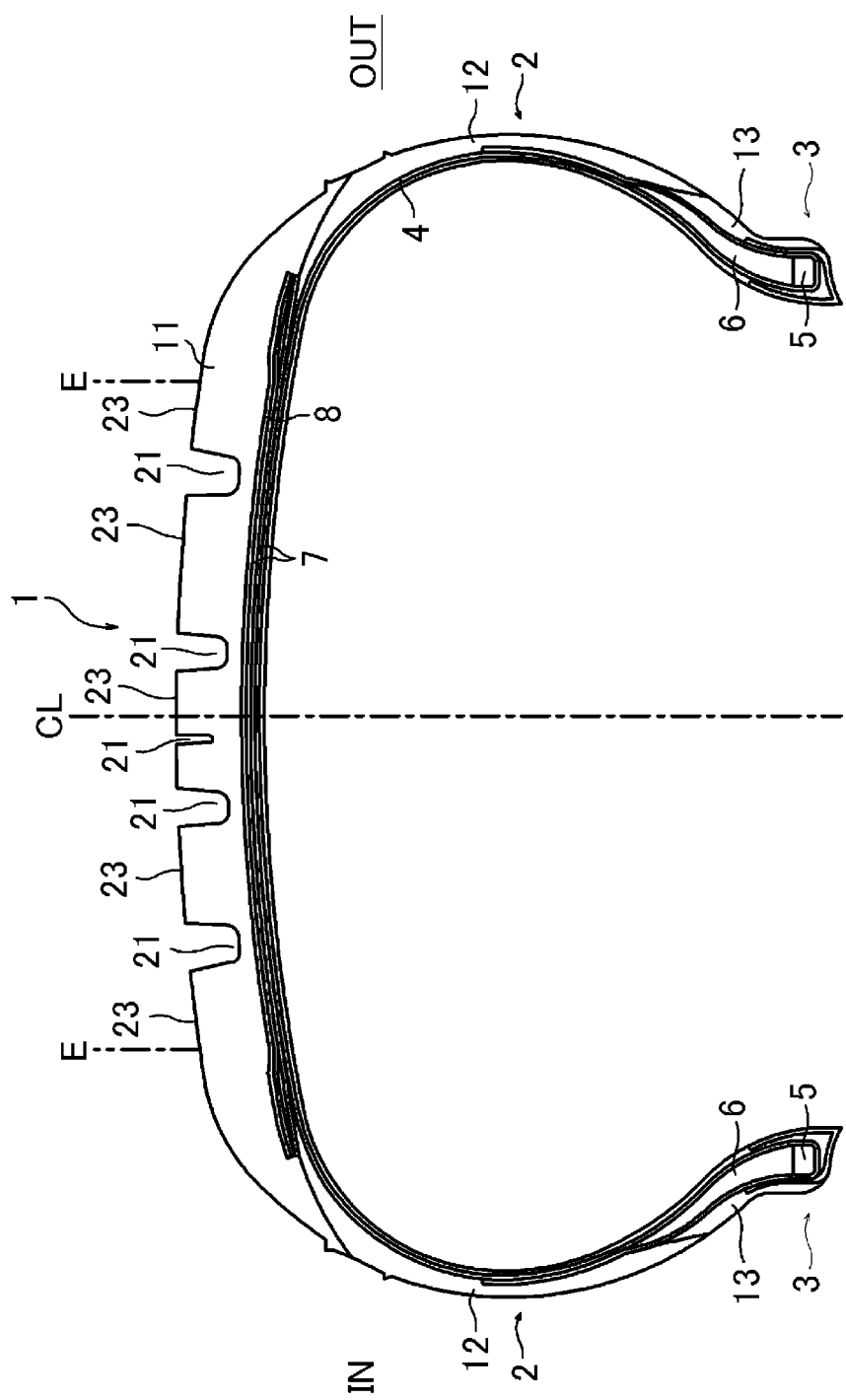
FIG. 1 is a meridian cross-sectional view of a pneumatic tire according to an embodiment of the present technology.

As illustrated in FIG. 1, the pneumatic tire of an embodiment of the present technology includes an annular tread portion 1 extending in the tire circumferential direction, a pair of sidewall portions 2 disposed on both sides of the tread portion 1, and a pair of bead portions 3 disposed inward of the sidewall portions 2 in the tire radial direction. In FIG. 1, reference sign "CL" denotes a tire equator, and reference sign "E" denotes a ground contact edge. A pneumatic tire of the present technology has a designated mounting direction with respect to a vehicle. In the drawings, "IN" denotes the side inward with respect to the vehicle when the tire is mounted on the vehicle (hereinafter, referred to as "vehicle inner side"), and "OUT" denotes the side outward with respect to the vehicle when the tire is mounted on the vehicle (hereinafter, referred to as "vehicle outer side"). Such a mounting direction can be determined by looking at an indicator located at a desired portion of the tire outer surface.

A carcass layer 4 is mounted between the left-right pair of bead portions 3. The carcass layer 4 includes a plurality of reinforcing cords extending in the tire radial direction, and is folded back around a bead core 5 disposed in each of the bead portions 3 from a vehicle inner side to a vehicle outer side. Additionally, bead fillers 6 are disposed on the periphery of the bead cores 5, and each bead filler 6 is enveloped by a main body portion and a folded back portion of the carcass layer 4. On the other hand, in the tread portion 1, a plurality of belt layers 7 (two layers in FIG. 1) are embedded on an outer circumferential side of the carcass layer 4. The belt layers 7 each include a plurality of reinforcing cords that are inclined with respect to the tire circumferential direction, with the reinforcing cords of the different layers arranged in a criss-cross manner. In these belt layers 7, the inclination angle of the reinforcing cords with respect to the tire circumferential direction ranges from, for example, 10° to 40°. In addition, a belt reinforcing layer 8 is provided on the outer circumferential side of the belt layers 7. The belt reinforcing layer 8 includes organic fiber cords oriented in the tire circumferential direction. In the belt reinforcing layer 8, the angle of the organic fiber cords with respect to the tire circumferential direction is set, for example, to from 0° to 5°.

A tread rubber layer 11 is disposed on the outer circumferential side of the carcass layer 4 in the tread portion 1. A side rubber layer 12 is disposed on the outer circumferential side (outward in the tire lateral direction) of the carcass layer 4 in each of the sidewall portions 2. A rim cushion rubber layer 13 is disposed on the outer circumferential side (outward in the tire lateral direction) of the carcass layer 4 in each of the bead portions 3. The tread rubber layer 11 may have a multilayer structure including two types of rubber layers (a cap tread rubber layer and an undertread rubber layer) with differing physical properties layered in the tire radial direction.

The present technology may be applied to such a general pneumatic tire, however, the cross-sectional structure thereof is not limited to the basic structure described above.

In the tread portion 1 of the pneumatic tire according to an embodiment of the present technology, longitudinal grooves 21 extending in the tire circumferential direction and lateral grooves 22 extending in the tire lateral direction are formed and define land portions 23. In the present technology, as long as a groove area ratio Sin in the vehicle inner side region and a groove area ratio Sout in the vehicle outer side region satisfy a specific relationship described below, the shapes (tread patterns) of the longitudinal grooves 21, the lateral grooves 22, and the land portions 23 are not particularly limited. For example, various configurations may be adopted including a pattern in which only the longitudinal grooves 21 are formed, a pattern in which only the lateral grooves 22 are formed, a pattern in which both the longitudinal grooves 21 and the lateral grooves 22 are formed, a pattern in which the land portions 23 are ribs that continuously extend in the tire circumferential direction, a pattern in which the land portions 23 are blocks, and the like.

Figure 2A:
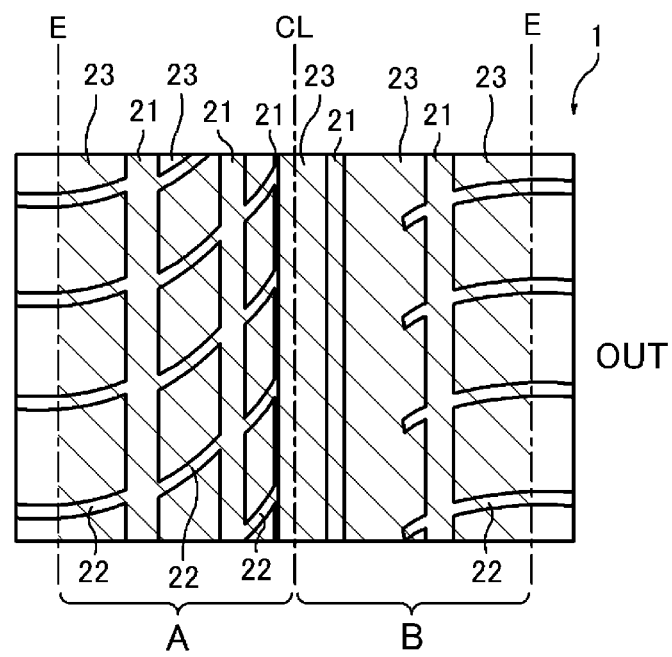
FIG. 2 is an explanatory diagram schematically illustrating a tread portion of a pneumatic tire according to an embodiment of the present technology.
Figure 2B:
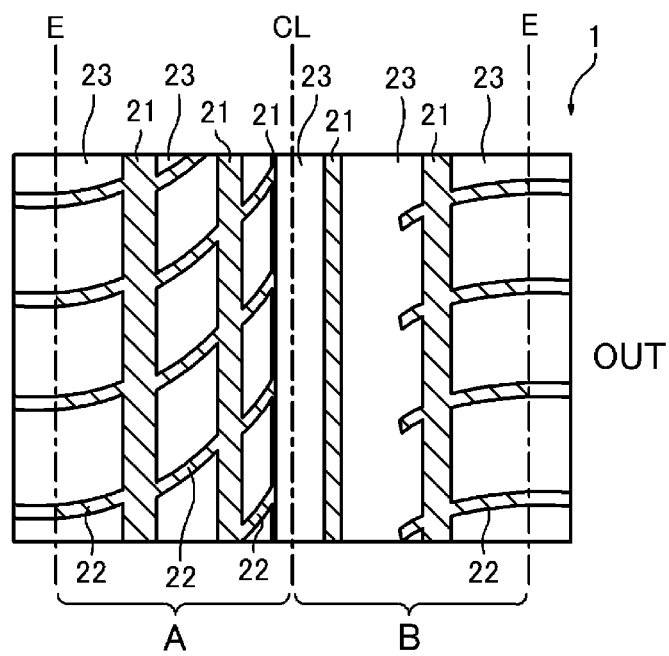

As illustrated in FIGS. 2A and 2B, the vehicle inner side defined by the tire equator CL of the tread portion 1 is defined as vehicle inner side region A, the vehicle outer side defined by the tire equator CL of the tread portion 1 is defined as vehicle outer side region B, and the ratio of the total area (the hatched portion in FIG. 2B) of the groove portions (the longitudinal grooves 21 and the laterals groove 22) to the total area (hatched portion in FIG. 2A) including the land portions 23 and the groove portions (the longitudinal grooves 21 and the lateral grooves 22) is defined as the groove area ratio. The groove area ratio Sin of the vehicle inner side region A ranges from 30% to 39% and preferably from 30% to 34%, and the groove area ratio Sout of the vehicle outer side region B ranges from 20% to 30% and preferably from 22% to 26%. The groove area ratios Sin and Sout are set with a groove area ratio difference $\Delta S$ ($=$Sin$-$Sout) ranging from 6% to 14% and preferably from 7% to 13%. Note that the longitudinal grooves 21 and the lateral grooves 22 may be narrow grooves or sipes, and the areas of the narrow grooves and sipes are added to the total area of the groove portions described above. When the groove area ratio satisfies the relationship described above, land portion rigidity on the vehicle outer side that contributes to dry performance (grip properties when turning) can be maintained, sufficient groove area on the vehicle inner side can be maintained, wet performance can be ensured, and these performances can be obtained in a well-balanced manner. When the groove area ratio Sin of the vehicle inner side region A is less than 30%, sufficient groove area cannot be ensured and wet performance is reduced. When the groove area ratio Sin of the vehicle inner side region A is greater than 39%, the total area of the road contact surface of the land portions 23 that come into contact with the road surface when driving is reduced and dry performance is reduced. When the groove area ratio Sout of the vehicle outer side region B is less than 20%, sufficient groove area cannot be ensured and wet performance is reduced. When the groove area ratio Sout of the vehicle outer side region B is greater than 30%, the difference in groove area ratio between the vehicle inner side region A and the vehicle outer side region B is decreased, and the effect obtained from reducing the groove area ratio of the vehicle outer side region B (increase in dry performance (grip properties when turning) is not sufficiently obtained. When the difference ΔS in groove area ratio is less than 6%, drainage performance is reduced, decreasing wet performance. When the difference ΔS in groove area ratio is greater than 14%, the ground contact area is decreased, making it difficult to sufficiently ensure dry performance.

A rubber composition of the tread rubber layer 11 of the pneumatic tire of the present technology (referred to below as "rubber composition for a tread") includes a rubber component of diene rubber, and also must include a natural rubber as well as a solution polymerized styrene-butadiene rubber and/or an emulsion polymerized styrene-butadiene rubber.

Any natural rubber that is typically used in rubber compositions for a tread can be used. By including a natural rubber, the rubber composition for a tread can be given sufficient rubber strength. When the total amount of the diene rubber is 100 parts by mass, the blended amount of the natural rubber ranges from 10 parts by mass to 30 parts by mass and preferably from 15 parts by mass to 25 parts by mass. When the blended amount of the natural rubber is less than 10 parts by mass, wear resistance at high speeds is reduced. When the blended amount of the natural rubber is greater than 30 parts by mass, dry performance is reduced.

For the solution polymerized styrene-butadiene rubber and the emulsion polymerized styrene-butadiene rubber, any rubbers typically used in rubber compositions for a tire can be used. These may be used alone or blended as desired. By including the solution polymerized styrene-butadiene rubber and/or the emulsion polymerized styrene-butadiene rubber, dry performance and wet performance are improved. When the total amount of the diene rubber is 100 parts by mass, the blended amount of the solution polymerized styrene-butadiene rubber and/or the emulsion polymerized styrene-butadiene rubber ranges from 70 parts by mass to 90 parts by mass and preferably from 75 parts by mass to 85 parts by mass. When the blended amount of the solution polymerized styrene-butadiene rubber and/or the emulsion polymerized styrene-butadiene rubber is less than 70 parts by mass, dry performance and wet performance are reduced. When the blended amount of the solution polymerized styrene-butadiene rubber and/or the emulsion polymerized styrene-butadiene rubber is greater than 90 parts by mass, wear resistance at high speeds is reduced.

The rubber composition for a tread of the present technology may include a diene rubber in addition to the natural rubber, solution polymerized styrene-butadiene rubber, and emulsion polymerized styrene-butadiene rubber. Examples of other diene rubbers include butadiene rubber, isoprene rubber, acrylonitrile-butadiene rubber, and the like. These diene rubbers may be used alone or as a desirable blend thereof.

The rubber composition for a tread of the present technology must include silica as a filler. By including silica, wet performance can be increased and rolling resistance can be reduced. The blended amount of silica is from 80 parts by mass to 150 parts by mass and preferably from 90 parts by mass to 140 parts by mass per 100 parts by mass of the diene rubber. When the blended amount of silica is less than 80 parts by mass, wet performance and rolling resistance are degraded. When the blended amount of silica is greater than 150 parts by mass, wear resistance at high speeds is degraded.

The silica used in the present technology has a CTAB adsorption specific surface area of from 180 $m^2/g$ to 250 $m^2/g$ and more preferably from 190 $m^2/g$ to 240 $m^2/g$. When the CTAB adsorption specific surface area of the silica is less than 180 $m^2/g$, wet performance is reduced. When the CTAB adsorption specific surface area of the silica is greater than 250 $m^2/g$, rolling resistance is degraded. Note that in the present technology, the CTAB adsorption specific surface area of the silica is measured in accordance with ISO (International Organization for Standardization) 5794.

The rubber composition for a tread of the present technology may also include an inorganic filler in addition to the silica. Examples of the inorganic filler include carbon black, clay, talc, calcium carbonate, mica, aluminum hydroxide, and the like.

The rubber composition for a tread of the present technology must include alkylsilane as a plasticizer. By including the alkylsilane, aggregation of the silicas and an increase in the viscosity of the rubber composition can be suppressed. This allows better rolling resistance and wet performance to be obtained. The alkylsilane used in the present technology is an alkyltriethoxysilane having an alkyl group having from 3 to 20 carbons. Examples of an alkyl group having from 3 to 20 carbons include a heptyl group, octyl group, nonyl group, decyl group, undecyl group, dodecyl group, tridecyl group, tetradecyl group, pentadecyl group, hexadecyl group, heptadecyl group, octadecyl group, nonadecyl group, and icosyl group. Among these, from the perspective of miscibility with the diene rubber, an alkyl group having from 8 to 10 carbons is preferable, and an octyl group or nonyl group is even more preferable. The blended amount of alkylsilane is from 3 mass % to 10 mass % and preferably from 4 mass % to 9 mass %, relative to the mass of silica. When the blended amount of alkylsilane is less than 3 mass %, wet performance and rolling resistance are degraded. When the blended amount of alkylsilane is greater than 10 mass %, wear resistance at high speeds is reduced.

The rubber composition for a tread of the present technology must include a cyclic polysulfide expressed by Formula 1 below. By compounding the cyclic polysulfide, grip performance across a broader temperature range can be enhanced and rubber hardness and rigidity can be increased, further enhancing the wear resistance of the rubber composition.

(I)

(In Formula 1, R is a substituted or unsubstituted alkylene group having from 4 to 8 carbons, or a substituted or unsubstituted oxyalkylene group having from 4 to 8 carbons; x is a number averaging from 3 to 5; and n is an integer from 1 to 5.)

In the cyclic polysulfide of Formula (I) above, R is an alkylene group or an oxyalkylene group, and the carbon number thereof is from 4 to 8 and preferably from 4 to 7. Examples of substituents on the alkylene group and oxyalkylene group include a phenyl group, benzyl group, methyl group, epoxy group, isocyanate group, vinyl group, silyl group and the like. S is sulfur. x is a number averaging from 3 to 5 and preferably averaging from 3.5 to 4.5. n is an integer from 1 to 5 and preferably from 1 to 4. Such a polycyclic sulfide can be produced by ordinary methods, for example, the production method described in Japan Unexamined Patent Publication No. 2007-092086.

In the present technology, the blended amount of the cyclic polysulfide per 100 parts by weight of the diene rubber is from 0.5 parts by mass to 10 parts by mass and preferably from 1 part by mass to 9 parts by mass. When the blended amount of the cyclic polysulfide is less than 0.5 parts by weight, the effect of maintaining grip performance at a high level for a long time and the effect of improving blowout resistance cannot be obtained. Additionally, a decrease in wear resistance of the rubber composition cannot be sufficiently suppressed. Furthermore, when the blended amount of the cyclic polysulfide is greater than 10 parts by weight, ease of processing is degraded.

In the rubber composition for a tire tread of the present technology, the cyclic polysulfide of the above Formula (I) acts as a vulcanizing agent. The vulcanizing agent may be the cyclic polysulfide alone, or may be used together with other vulcanizing agents. An example of a vulcanizing agent that can be used is sulfur. When sulfur is used in combination, the blended amount of sulfur per 100 parts by weight of the diene rubber is from 0.3 parts by mass to 4 parts by mass and preferably from 0.5 parts by mass to 3.5 parts by mass. When sulfur is blended, the weight ratio of cyclic polysulfide to sulfur (cyclic polysulfide/sulfur) is preferably from 1/5 to 10/1 and more preferably from 1/4 to 4/1. Due to the weight ratio of cyclic polysulfide/sulfur being within such a range, the effect of maintaining grip performance at a high level for a long time is obtained, blowout resistance is improved, and wear resistance is improved.

In the rubber composition for a tread of the present technology, grip performance can be improved by further blending an aromatic terpene resin with the compounding agents described above. The aromatic modified terpene resin is obtained by polymerizing a terpene and an aromatic compound. Examples of the terpene include α-pinene, β-pinene, dipentene, and limonene. Examples of the aromatic compound include styrene, α-methylstyrene, vinyl toluene, and indene. The blended amount of the aromatic terpene resin per 100 parts by mass of the diene rubber is preferably from 1 parts by mass to 25 parts by mass and more preferably from 3 parts by mass to 23 parts by mass. When the blended amount of the aromatic terpene resin is less than 1 parts by mass, an effect of increasing grip properties cannot be sufficiently obtained. When the blended amount of the aromatic terpene resin is greater than 25 parts by mass the adhesiveness of the rubber composition is increased, and forming processability and handling properties are degraded due to the composition adhering to the forming roller and the like.

The aromatic terpene resin preferably has a softening point of from 80° C. to 160° C. and more preferably from 85° C. to 140° C. When the softening point of the aromatic modified terpene resin is less than 80° C., an effect of enhancing grip performance cannot be sufficiently obtained. When the softening point of the aromatic modified terpene resin is greater than 160° C., wear resistance tends to be degraded. Note that the softening point of the aromatic modified terpene resin is measured according to JIS (Japanese Industrial Standard) K 6220-1 (ball and ring method).

The rubber composition for a tread of the present technology may also include compounding agents in addition to those described above. Examples of compounding agents include a vulcanization accelerator, an anti-aging agent, liquid polymers, a thermosetting resin, a thermoplastic resin, and other compounding agents that are commonly used in rubber composition for a tire. These compounding agents can be blended at conventional, typical blended amounts so long as the present technology is not hindered. Examples of a kneader include typical rubber kneading machines, such as a Banbury mixer, a kneader, and a roller.

The rubber composition for a tread of the present technology, due to the composition and the physical properties described above, can provide excellent dry performance and wet performance, reduced rolling resistance, and enhanced wear resistance at high speeds. Thus, a pneumatic tire using the rubber composition for a tread in a tread portion 1 can obtain good performance in a well-balanced manner to a high degree. In particular, a pneumatic tire in which the groove area ratio relationship described above is satisfied has good performance in a compatible manner to a very high degree due to the effect from the rubber composition for a tread and the effect from the groove area ratio.

The present technology is further explained below by examples. However, the scope of the present technology is not limited to these examples.

Example

For 27 different rubber compositions (Standard Example 1, Comparative Examples 1 to 7, and Examples 1 to 19) of the ingredients and their amounts listed in Tables 1 to 3 (the rubber components and their amounts listed in Table 3 are same among the examples), ingredients other than the vulcanization accelerator and sulfur were weighed, kneaded in a 1.7 L sealed Banbury mixer for 5 minutes, then discharged as a master batch at a temperature of 155° C. and cooled at room temperature. Next, the master batch was placed in the 1.7 L sealed Banbury mixer, and the vulcanization accelerator and sulfur were added. This was mixed for 3 minutes to obtain a rubber composition. Then, the obtained rubber composition was press vulcanized in a predetermined mold at 160° C. for 20 minutes to fabricate a vulcanized rubber test piece.

The obtained rubber compositions were evaluated for rubber hardness, tan δ at 60° C., and wear resistance at high speeds according to the methods described below.

Rubber Hardness

The rubber hardness of the obtained test pieces was measured at a temperature of 20° C. with a type A durometer in accordance with JIS K6253. The obtained results are represented by index values in the "Hardness" row in Tables 1 and 2, with the value of Standard Example 1 being assigned 100. Larger index values indicate greater rubber hardness.

Tan δ at 60° C.

Using a viscoelastic spectrometer, available from Toyo Seiki Seisaku-sho, Ltd., the loss tangent, i.e., tan δ, at a temperature of 60° C. of the obtained test piece was measured in accordance with JIS K6394 at an initial strain of 10%, an amplitude of ±2%, and a frequency of 20 Hz. The obtained results are represented by index values in the "tan δ (60° C.)" row in Tables 1 and 2, with the value of Standard Example 1 being assigned 100. Smaller index values indicate lower rolling resistance and superior fuel economy performance.

Wear Resistance at High Speeds

Dumbbell-shaped No. 3 test pieces were punched out from the obtained test pieces in accordance with JIS K6251. The test pieces were measured for tensile strength at break at a temperature of 100° C. and a tensile speed of 500 mm/min. The obtained results are represented by index values in the "Wear resistance" row in Tables 1 and 2, with the value of Standard Example 1 being assigned 100. Larger index values indicate greater tensile strength at break and superior wear resistance in a formed tire.

TABLE 1

|  |  | Standard Example 1 | Example 1 | Example 2 | Example 3 | Example 4 | Example 5 |
|---|---|---|---|---|---|---|---|
| NR | Part by mass | 15 | 15 | 15 | 15 | 15 | 15 |
| SBR | Part by mass | 116.9 (85) | 116.9 (85) | 116.9 (85) | 116.9 (85) | 116.9 (85) | 116.9 (85) |
| CB | Part by mass | 60 | 20 | 20 | 20 | 20 | 20 |
| Silica 1 | Part by mass | 70 | 120 | 120 | 120 | 120 | 120 |
| Silica 2 | Part by mass |  |  |  |  |  |  |
| Silane coupling agent (Silica proportion) | Part by mass (mass %) | 4.2 (6.0) | 7.2 (6.0) | 7.2 (6.0) | 7.2 (6.0) | 7.2 (6.0) | 7.2 (6.0) |
| Alkylsilane 1 (Silica proportion) | Part by mass (mass %) | 2.8 (4.0) | 4.8 (4.0) | 4.8 (4.0) | 4.8 (4.0) | 4.8 (4.0) | 4.8 (4.0) |
| Alkylsilane 2 (Silica proportion) | Part by mass (mass %) |  |  |  |  |  |  |
| Aromatic terpene resin | Part by mass |  |  |  |  |  |  |
| Aroma oil | Part by mass | 25 | 25 | 25 | 25 | 25 | 25 |
| Sulfur | Part by mass | 2.4 | 1.2 |  |  |  |  |
| Cyclic polysulfide | Part by mass |  | 2 | 0.5 | 4 | 8 | 10 |
| Rubber hardness | Index value | 100 | 105 | 101 | 108 | 110 | 112 |
| tan δ (60° C.) | Index value | 100 | 95 | 99 | 94 | 92 | 91 |
| Wear resistance | Index value | 100 | 105 | 101 | 108 | 112 | 114 |

|  |  | Comparative Example 1 | Comparative Example 2 | Example 6 | Example 7 | Comparative Example 3 |
|---|---|---|---|---|---|---|
| NR | Part by mass | 15 | 5 | 10 | 30 | 40 |
| SBR | Part by mass | 116.9 (85) | 130.3 (95) | 123.8 (90) | 96.3 (70) | 82.5 (60) |
| CB | Part by mass | 20 | 20 | 20 | 20 | 20 |
| Silica 1 | Part by mass | 120 | 120 | 120 | 120 | 120 |
| Silica 2 | Part by mass |  |  |  |  |  |
| Silane coupling agent (Silica proportion) | Part by mass (mass %) | 7.2 (6.0) | 7.2 (6.0) | 7.2 (6.0) | 7.2 (6.0) | 7.2 (6.0) |
| Alkylsilane 1 (Silica proportion) | Part by mass (mass %) | 4.8 (4.0) | 4.8 (4.0) | 4.8 (4.0) | 4.8 (4.0) | 4.8 (4.0) |
| Alkylsilane 2 (Silica proportion) | Part by mass (mass %) |  |  |  |  |  |
| Aromatic terpene resin | Part by mass |  |  |  |  |  |
| Aroma oil | Part by mass | 25 | 21 | 23 | 30 | 34 |
| Sulfur | Part by mass |  | 1.2 | 1.2 | 1.2 | 1.2 |
| Cyclic polysulfide | Part by mass | 12 | 2 | 2 | 2 | 2 |
| Rubber hardness | Index value | 114 | 105 | 104 | 102 | 105 |
| tan δ (60° C.) | Index value | 90 | 97 | 96 | 94 | 93 |
| Wear resistance | Index value | 115 | 100 | 103 | 106 | 108 |

TABLE 1-continued

|  |  | Comparative Example 4 | Example 8 | Example 9 | Example 10 | Comparative Example 5 |
|---|---|---|---|---|---|---|
| NR | Part by mass | 15 | 15 | 15 | 15 | 15 |
| SBR | Part by mass | 116.9 (85) | 116.9 (85) | 116.9 (85) | 116.9 (85) | 116.9 (85) |
| CB | Part by mass | 70 | 60 | 50 | 10 |  |
| Silica 1 | Part by mass | 70 | 80 | 90 | 130 | 160 |
| Silica 2 | Part by mass |  |  |  |  |  |
| Silane coupling agent (Silica proportion) | Part by mass (mass %) | 4.2 (6.0) | 4.8 (6.0) | 5.4 (6.0) | 7.8 (6.0) | 9.6 (6.0) |
| Alkylsilane 1 (Silica proportion) | Part by mass (mass %) | 2.8 (4.0) | 3.2 (4.0) | 3.6 (4.0) | 5.2 (4.0) | 6.4 (4.0) |
| Alkylsilane 2 (Silica proportion) | Part by mass (mass %) |  |  |  |  |  |
| Aromatic terpene resin | Part by mass |  |  |  |  |  |
| Aroma oil | Part by mass | 25 | 25 | 25 | 25 | 25 |
| Sulfur | Part by mass | 1.2 | 1.2 | 1.2 | 1.2 | 1.2 |
| Cyclic polysulfide | Part by mass | 2 | 2 | 2 | 2 | 2 |
| Rubber hardness | Index value | 105 | 105 | 105 | 105 | 106 |
| tan δ (60° C.) | Index value | 103 | 99 | 98 | 92 | 103 |
| Wear resistance | Index value | 114 | 110 | 108 | 103 | 99 |

TABLE 2

|  |  | Comparative Example 6 | Example 11 | Example 12 | Example 13 | Comparative Example 7 |
|---|---|---|---|---|---|---|
| NR | Part by mass | 15 | 15 | 15 | 15 | 15 |
| SBR | Part by mass | 116.9 (85) | 116.9 (85) | 116.9 (85) | 116.9 (85) | 116.9 (85) |
| CB | Part by mass | 20 | 20 | 20 | 20 | 20 |
| Silica 1 | Part by mass | 120 | 120 | 120 | 120 | 120 |
| Silica 2 | Part by mass |  |  |  |  |  |
| Silane coupling agent (Silica proportion) | Part by mass (mass %) | 7.2 (6.0) | 7.2 (6.0) | 7.2 (6.0) | 7.2 (6.0) | 7.2 (6.0) |
| Alkylsilane 1 (Silica proportion) | Part by mass (mass %) | 2.4 (2.0) | 3.6 (3.0) | 9.6 (8.0) | 12 (10.0) | 14.4 (12.0) |
| Alkylsilane 2 (Silica proportion) | Part by mass (mass %) |  |  |  |  |  |
| Aromatic terpene resin | Part by mass |  |  |  |  |  |
| Aroma oil | Part by mass | 25 | 25 | 25 | 25 | 25 |
| Sulfur | Part by mass | 1.2 | 1.2 | 1.2 | 1.2 | 1.2 |
| Cyclic polysulfide | Part by mass | 2 | 2 | 2 | 2 | 2 |
| Rubber hardness | Index value | 107 | 105 | 103 | 101 | 99 |
| tan δ (60° C.) | Index value | 101 | 98 | 92 | 90 | 88 |
| Wear resistance | Index value | 105 | 105 | 103 | 101 | 99 |

TABLE 2-continued

|  |  | Example 14 | Example 15 | Example 16 | Example 17 | Example 18 | Example 19 |
|---|---|---|---|---|---|---|---|
| NR | Part by mass | 15 | 15 | 15 | 15 | 15 | 15 |
| SBR | Part by mass | 116.9 (85) | 116.9 (85) | 116.9 (85) | 116.9 (85) | 116.9 (85) | 116.9 (85) |
| CB | Part by mass | 20 | 20 | 20 | 20 | 20 | 20 |
| Silica 1 | Part by mass | 120 |  | 120 | 120 | 120 | 120 |
| Silica 2 | Part by mass |  | 120 |  |  |  |  |
| Silane coupling agent (Silica proportion) | Part by mass (mass %) | 7.2 (6.0) | 7.2 (6.0) | 7.2 (6.0) | 7.2 (6.0) | 7.2 (6.0) | 7.2 (6.0) |
| Alkylsilane 1 (Silica proportion) | Part by mass (mass %) |  | 4.8 (4.0) | 4.8 (4.0) | 4.8 (4.0) | 4.8 (4.0) | 4.8 (4.0) |
| Alkylsilane 2 (Silica proportion) | Part by mass (mass %) | 4.8 (4.0) |  |  |  |  |  |
| Aromatic terpene resin | Part by mass |  |  | 1 | 20 | 25 | 30 |
| Aroma oil | Part by mass | 25 | 25 | 24 | 5 |  |  |
| Sulfur | Part by mass | 1.2 | 1.2 | 1.2 | 1.2 | 1.2 | 1.2 |
| Cyclic polysulfide | Part by mass | 2 | 2 | 2 | 2 | 2 | 2 |
| Rubber hardness | Index value | 106 | 107 | 105 | 106 | 107 | 105 |
| tan δ (60° C.) | Index value | 96 | 97 | 95 | 97 | 97 | 97 |
| Wear resistance | Index value | 105 | 107 | 105 | 107 | 108 | 109 |

TABLE 3

|  |  | Blended amount |
|---|---|---|
| Zinc oxide | Part by mass | 2.0 |
| Stearic acid | Part by mass | 1.0 |
| Anti-aging agent 1 | Part by mass | 3.0 |
| Anti-aging agent 2 | Part by mass | 2.0 |
| Vulcanization accelerator 1 | Part by mass | 2.0 |
| Vulcanization accelerator 2 | Part by mass | 1.0 |

Types of raw materials used as indicated in Tables 1 to 3 are described below.

NR: natural rubber, SIR20

SBR: styrene-butadiene rubber, NIPOL 9548 (oil extended product, styrene content: 37%, 37.5 parts by mass of oil per 100 parts by mass of rubber component) available from ZEON CORPORATION CB: Carbon black, N-134 available from THAI TOKAI CARBON Silica 1: ULTRASIL 7000GR (CTAB adsorption specific surface area: 158 m$^2$/g) available from Evonik Industries Silica 2: ULTRASIL 9000GR (CTAB adsorption specific surface area: 200 m$^2$/g) available from Evonik Industries Silane coupling agent 1: Si69 available from Evonik Degussa Alkylsilane 1: KBE-3083 (alkyltriethoxysilane having an alkyl group having 8 carbons) available from Shin-Etsu Chemical Co., Ltd.

Alkylsilane 2: KBE-3063 (alkyltriethoxysilane having an alkyl group having 6 carbons) available from Shin-Etsu Chemical Co., Ltd.

Aromatic terpene resin: TO-125 available from Yasuhara Chemical Co., Ltd.

Aroma oil: VIVATEC 500 available from H&R Chemical

Sulfur: Golden Flower oil treated sulfur powder (sulfur content: 95.24 mass %), available from Tsurumi Chemical Industry Co., Ltd.

Cyclic polysulfide: cyclic polysulfide synthesized according to the method of Example 3 in JP 2002-293783 A (in Formula 1, R is $(CH_2)_6$, x (average value) is 4, and n is from 1 to 5.)

Zinc oxide: Zinc Oxide III available from Seido Chemical Industry Co., Ltd.

Stearic acid: Beads stearic acid available from NOF Corporation

Anti-aging agent 1: Santoflex 6PPD available from Solutia Europe

Anti-aging agent 2: PILNOX TDQ available from NOCIL LIMITED

Vulcanization accelerator 1: NOCCELER CZ-G available from Ouchi Shinko Chemical Industrial Co., Ltd.

Vulcanization accelerator 2: Soxinol D-G available from Sumitomo Chemical Co., Ltd.

Using the 27 different rubber compositions described above (Standard Example 1, Comparative Examples 1 to 7, Examples 1 to 19), 40 different pneumatic tires corresponding to Standard Tire 1, Comparative Tires 1 to 9, and Example Tires 1 to 30 were manufactured with a tire size of 195/65R15 and the basic structure illustrated in FIG. 1. These pneumatic tires are set as indicated in Tables 4 to 6 for: type of rubber composition used, vehicle inner side groove area ratio Sin, vehicle outer side groove area ratio Sout, and difference ΔS in groove area ratio.

These forty types of pneumatic tires were evaluated for dry performance and wet performance by the evaluation methods described below, and the results are shown in Tables 4 to 6.

Dry Performance

The test tires were mounted on standard rims (rim size of 195×65R15), adjusted to an air pressure of 250 kPa, and mounted on a test vehicle. The test vehicle was driven on a test course with a dry road surface, and responsiveness when turning was evaluated by sensory evaluation by a test driver. The evaluation results were each put into one of five levels, with a score of 3 being the standard. The results are shown in the "dry performance" row in Tables 4 to 6. Higher scores indicate superior dry performance (steering stability on dry road surfaces).

Wet Performance

The test tires were mounted on standard rims (rim size of 195×65R15), adjusted to an air pressure of 250 kPa, and mounted on a test vehicle. The test vehicle was driven on a test course with a 1 mm-layer of water, and responsiveness when turning was evaluated by sensory evaluation by a test driver. The evaluation results were each put into one of five levels, with a score of 3 being the standard. The results are shown in the "wet performance" row in Tables 4 to 6. Higher scores indicate superior wet performance (steering stability on wet road surfaces).

TABLE 4

|  | Standard Tire 1 | Example Tire 1 | Example Tire 2 | Example Tire 3 | Example Tire 4 | Example Tire 5 | Comparative Tire 1 |
| --- | --- | --- | --- | --- | --- | --- | --- |
| Type of rubber composition | Standard Example 1 | Example 1 | Example 2 | Example 3 | Example 4 | Example 5 | Comparative Example 1 |
| Groove area % ratio Sin | 32 | 32 | 32 | 32 | 32 | 32 | 32 |
| Groove area % ratio Sout | 24 | 24 | 24 | 24 | 24 | 24 | 24 |
| Difference % ΔS | 8 | 8 | 8 | 8 | 8 | 8 | 8 |
| Dry performance | 3 | 4 | 4 | 5 | 5 | 4 | 3 |
| Wet performance | 3 | 4 | 4 | 4 | 4 | 4 | 4 |

|  | Comparative Tire 2 | Example Tire 6 | Example Tire 7 | Comparative Tire 3 | Comparative Tire 4 | Example Tire 8 | Example Tire 9 |
| --- | --- | --- | --- | --- | --- | --- | --- |
| Type of rubber composition | Comparative Example 2 | Example 6 | Example 7 | Comparative Example 3 | Comparative Example 4 | Example 8 | Example 9 |
| Groove area % ratio Sin | 32 | 32 | 32 | 32 | 32 | 32 | 32 |
| Groove area % ratio Sout | 24 | 24 | 24 | 24 | 24 | 24 | 24 |
| Difference % ΔS | 8 | 8 | 8 | 8 | 8 | 8 | 8 |
| Dry performance | 4 | 4 | 4 | 3 | 4 | 4 | 4 |
| Wet performance | 4 | 4 | 4 | 4 | 3 | 4 | 4 |

TABLE 5

|  | Example Tire 10 | Comparative Tire 5 | Comparative Tire 6 | Example Tire 11 | Example Tire 12 | Example Tire 13 |
| --- | --- | --- | --- | --- | --- | --- |
| Type of rubber composition | Example 10 | Comparative Example 5 | Comparative Example 6 | Example 11 | Example 12 | Example 13 |
| Groove area % ratio Sin | 32 | 32 | 32 | 32 | 32 | 32 |
| Groove area % ratio Sout | 24 | 24 | 24 | 24 | 24 | 24 |
| Difference ΔS % | 8 | 8 | 8 | 8 | 8 | 8 |
| Dry performance | 4 | 4 | 4 | 4 | 4 | 4 |
| Wet performance | 5 | 4 | 4 | 4 | 4 | 5 |

|  | Comparative Tire 7 | Example Tire 14 | Example Tire 15 | Example Tire 16 | Example Tire 17 | Example Tire 18 | Example Tire 19 |
| --- | --- | --- | --- | --- | --- | --- | --- |
| Type of rubber composition | Comparative Example 7 | Example 14 | Example 15 | Example 16 | Example 17 | Example 18 | Example 19 |
| Groove area % ratio Sin | 32 | 32 | 32 | 32 | 32 | 32 | 32 |
| Groove area % ratio Sout | 24 | 24 | 24 | 24 | 24 | 24 | 24 |

TABLE 5-continued

| | | | | | | | |
|---|---|---|---|---|---|---|---|
| Difference % ΔS | 8 | 8 | 8 | 8 | 8 | 8 | 8 |
| Dry performance | 3 | 4 | 5 | 4 | 4 | 4 | 5 |
| Wet performance | 5 | 4 | 5 | 4 | 5 | 5 | 5 |

TABLE 6

| | Comparative Tire 8 | Example Tire 20 | Example Tire 21 | Example Tire 22 | Example Tire 23 | Comparative Tire 9 |
|---|---|---|---|---|---|---|
| Type of rubber composition | Example 1 | Example 1 | Example 1 | Example 1 | Example 1 | Example 1 |
| Groove area % ratio Sin | 28 | 30 | 34 | 36 | 38 | 40 |
| Groove area % ratio Sout | 24 | 24 | 24 | 24 | 24 | 24 |
| Difference % ΔS | 4 | 6 | 10 | 12 | 14 | 16 |
| Dry performance | 4 | 4 | 4 | 4 | 4 | 3 |
| Wet performance | 3 | 4 | 5 | 5 | 4 | 4 |

| | Example Tire 24 | Example Tire 25 | Example Tire 26 | Example Tire 27 | Example Tire 28 | Example Tire 29 | Example Tire 30 |
|---|---|---|---|---|---|---|---|
| Type of rubber composition | Example 1 | Example 1 | Example 1 | Example 1 | Example 1 | Example 1 | Example 1 |
| Groove area ratio % Sin | 30 | 31 | 32 | 35 | 37 | 38 | 39 |
| Groove area ratio % Sout | 19 | 20 | 22 | 26 | 28 | 30 | 31 |
| Difference ΔS % | 11 | 11 | 10 | 9 | 9 | 8 | 8 |
| Dry performance | 4 | 5 | 4 | 4 | 4 | 4 | 4 |
| Wet performance | 4 | 4 | 4 | 5 | 4 | 4 | 4 |

As can be seen from Tables 1 to 2, the rubber compositions of Examples 1 to 19 had enhanced rubber hardness, tan δ at 60° C., and wear resistance at high speeds compared to Standard Example 1 and obtained these performances in a well-balanced manner. Also, as can be seen from Tables 4 to 6, the Example Tires 1 to 30 made using the rubber compositions of Examples 1 to 19 had a good relationship between the groove area ratio on the vehicle inner side and the vehicle outer side and obtained dry performance and wet performance in a compatible manner to a high degree.

The rubber composition of Comparative Example 1 and Comparative Tire 1 made using this rubber composition had too much cyclic polysulfide. Thus, the rubber hardness was too high and an effect of enhancing dry performance was not obtained. The rubber composition of Comparative Example 2 and Comparative Tire 2 made using this rubber composition had too little natural rubber. Thus, an effect of enhancing wear resistance at high speeds was not obtained. The rubber composition of Comparative Example 3 and Comparative Tire 3 made using this rubber composition had too much natural rubber. Thus, an effect of enhancing dry performance was not obtained. The rubber composition of Comparative Example 4 and Comparative Tire 4 made using this rubber composition had too little silica. Thus, tan δ at 60° C. was degraded and an effect of enhancing wet performance was not obtained. The rubber composition of Comparative Example 5 and Comparative Tire 5 made using this rubber composition had too much silica. Thus, wear resistance at high speeds was degraded. The rubber composition of Comparative Example 6 and Comparative Tire 6 made using this rubber composition had too little alkylsilane. Thus, tan δ at 60° C. was degraded. The rubber composition of Comparative Example 7 and Comparative Tire 7 made using this rubber composition had too much alkylsilane. Thus, wear resistance at high speeds was degraded.

Comparative Tire 8 was made using the rubber composition of Example 1. However, the vehicle inner side groove area ratio Sin was too low and the difference ΔS in groove area ratio was too low. Thus, an effect of enhancing wet performance was not obtained. Comparative Tire 9 was made using the rubber composition of Example 1. However, the vehicle inner side groove area ratio Sin was too high and the difference ΔS in groove area ratio was too great. Thus, an effect of enhancing dry performance was not obtained.

The invention claimed is:

1. A pneumatic tire, comprising:
a designated mounting direction with respect to a vehicle; and
a tread portion with an annular shape extending in a tire circumferential direction, the tread portion comprising longitudinal grooves extending in the tire circumferential direction and/or lateral grooves extending in a tire lateral direction, and being made of a rubber composition for a tread; wherein
a groove area ratio Sin of a vehicle inner side region corresponding to a vehicle inner side of a tire equator of the tread portion ranges from 30% to 39%;
a difference ΔS between the groove area ratio Sin and a groove area ratio Sout of a vehicle outer side region corresponding to a vehicle outer side of a position the tire equator of the tread portion ranges from 6% to 14%; and
the rubber composition for a tread comprises
a diene rubber comprising from 10 parts by mass to 30 parts by mass of natural rubber and from 70 parts by mass to 90 parts by mass of a solution polymerized styrene-butadiene rubber and/or an emulsion polymerized styrene-butadiene rubber per 100 parts by mass of the diene rubber,
from 80 parts by mass to 150 parts by mass of silica per 100 parts by mass of the diene rubber,
from 0.5 parts by mass to 10 parts by mass of a cyclic polysulfide expressed by Formula 1 below per 100 parts by mass of the diene rubber, and
from 3 mass % to 10 mass % of an alkyltriethoxysilane having an alkyl group having from 3 to 20 carbons relative to an amount of the silica

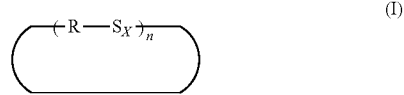
(I)

in Formula 1, R is a substituted or unsubstituted alkylene group having from 4 to 8 carbons, or a substituted or unsubstituted oxyalkylene group having from 4 to 8 carbons; x is a number averaging from 3 to 5; and n is an integer from 1 to 5.

2. The pneumatic tire according to claim 1, wherein the groove area ratio Sout ranges from 20% to 30%.

3. The pneumatic tire according to claim 2, wherein the silica has a CTAB adsorption specific surface area ranging from 180 $m^2/g$ to 250 $m^2/g$.

4. The pneumatic tire according to claim 3, wherein from 1 part by mass to 25 parts by mass of an aromatic terpene resin is blended per 100 parts by mass of the diene rubber.

5. The pneumatic tire according to claim 1, wherein the silica has a CTAB adsorption specific surface area ranging from 180 $m^2/g$ to 250 $m^2/g$.

6. The pneumatic tire according to claim 1, wherein from 1 part by mass to 25 parts by mass of an aromatic terpene resin is blended per 100 parts by mass of the diene rubber.

* * * * *